United States Patent
Thörn

(10) Patent No.: US 8,532,346 B2
(45) Date of Patent: Sep. 10, 2013

(54) DEVICE, METHOD AND COMPUTER PROGRAM PRODUCT

(75) Inventor: Karl Ola Thörn, Malmö (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1139 days.

(21) Appl. No.: 12/402,260

(22) Filed: Mar. 11, 2009

(65) Prior Publication Data

US 2010/0232704 A1   Sep. 16, 2010

(51) Int. Cl.
    *G06K 9/00*   (2006.01)

(52) U.S. Cl.
    USPC ........... 382/118; 382/115; 382/116; 382/117; 382/305; 382/103; 382/298; 382/321; 348/240.99; 345/620; 345/650

(58) Field of Classification Search
    USPC ............... 382/115–118, 103, 305, 298, 321; 348/240.99; 345/620, 650
    See application file for complete search history.

(56) References Cited

U.S. PATENT DOCUMENTS

| | | | |
|---|---|---|---|
| 5,396,287 A | 3/1995 | Cho | |
| 5,557,328 A * | 9/1996 | Ishihama et al. | 348/240.3 |
| 5,615,384 A * | 3/1997 | Allard et al. | 715/800 |
| 5,742,279 A * | 4/1998 | Yamamoto et al. | 345/173 |
| 5,960,448 A * | 9/1999 | Reichek et al. | 715/236 |
| 6,137,469 A * | 10/2000 | Wu et al. | 345/660 |
| 6,304,271 B1 * | 10/2001 | Nehme | 345/620 |
| 6,424,355 B2 * | 7/2002 | Watanabe et al. | 345/668 |
| 6,774,890 B2 * | 8/2004 | Engholm | 345/173 |
| 6,906,746 B2 * | 6/2005 | Hijishiri et al. | 348/240.2 |
| 7,224,393 B2 * | 5/2007 | Ojima et al. | 348/333.03 |
| 7,511,745 B2 * | 3/2009 | Aoyama | 348/240.2 |
| 7,852,356 B2 * | 12/2010 | Takikawa et al. | 345/660 |
| 8,203,640 B2 * | 6/2012 | Kim et al. | 348/333.12 |
| 2001/0014006 A1 | 8/2001 | Kim et al. | |
| 2003/0164861 A1 | 9/2003 | Barbanson et al. | |
| 2004/0169668 A1 * | 9/2004 | Yamada et al. | 345/660 |
| 2008/0174563 A1 * | 7/2008 | Kim | 345/173 |

(Continued)

FOREIGN PATENT DOCUMENTS

| | | |
|---|---|---|
| EP | 0 651 543 A2 | 5/1995 |
| GB | 2 406 674 A | 4/2005 |

(Continued)

OTHER PUBLICATIONS

Multi-Scale Video cropping., Alfy et al., ACM, 978-1-59593-701-8, 2007, pp. 97-106.*

(Continued)

*Primary Examiner* — Jayesh A Patel
(74) *Attorney, Agent, or Firm* — Harrity & Harrity, LLP

(57) ABSTRACT

A device is provided, in which a display screen displays an image; an image analyzer determines at least one potential area of interest in the image; a visual indicator highlights at least a boundary of the at least one potential area of interest, and an optical zoom and/or a digital zoom changes the magnification level of an area of interest selected from the at least one potential area of interest. The device permits a user to zoom in and/or zoom out of the selected area of interest by displacing the boundary of the selected area of interest over at least a portion of the display screen.

16 Claims, 3 Drawing Sheets

(56) References Cited

U.S. PATENT DOCUMENTS

2008/0279480 A1* 11/2008 Inamoto et al. ............... 382/305
2008/0282179 A1   11/2008 Kim et al.
2009/0097711 A1*  4/2009 Chen et al. .................... 382/103
2009/0109243 A1*  4/2009 Kraft et al. .................... 345/660
2009/0153649 A1*  6/2009 Hirooka et al. ................ 348/47
2010/0013977 A1*  1/2010 Suzuki .................... 348/333.11
2010/0287053 A1* 11/2010 Ganong et al. ............. 705/14.66
2012/0019563 A1*  1/2012 Misawa et al. ................ 345/661

FOREIGN PATENT DOCUMENTS

| JP | 2003-233368 A | | 8/2003 |
| JP | 2003233368 | * | 8/2003 |
| JP | 2008-078802 A | | 4/2008 |
| KR | 1020060035198 A | * | 4/2006 |

OTHER PUBLICATIONS

PCT International Search Report and Written Opinion of the International Searching Authority, corresponding to PCT/EP2009/060319, mailed Feb. 8, 2010, 9 pages.

* cited by examiner

DEVICE, METHOD AND COMPUTER PROGRAM PRODUCT

TECHNICAL FIELD

The present invention generally relates to a device including a display screen for displaying an image and, more particularly, to a method for zooming in and/or zooming out part of that image.

BACKGROUND OF THE INVENTION

A conventional lens in a camera works by accumulating visible light rays associated with an object, which are projected over a portion of a film or a digital camera optical sensor to form an image of the object. An optical zoom function of the camera may be used to change the magnification of the image before it is captured. A digital zoom may be used to change the magnification of an image after it has been captured.

An optical zoom arrangement may include a zoom lens whose focal length, and consequently the viewing distance and field of view of the camera, can be adjusted using the camera's optics, thereby changing the magnification of a projected image. A digital zoom arrangement may crop a captured image down to centered area with the same aspect ratio as the original image (and usually also interpolating the result back up to the pixel dimensions of the original).

The zoom in/zoom out functions of a camera may be activated by a user activating designated control buttons on the camera and/or touching icons on a touch screen of the camera, by which the image is displayed. Naturally, the use of such control buttons/icons occupies valuable, limited camera space and/or display screen space. Additionally, onscreen control icons may obstruct a portion of the displayed image.

Alternative activation zoom in/zoom out functions may involve a user making designated gestures, such as a clockwise or anticlockwise circle gesture, or a closing or opening pinch gesture, across a touch screen displaying an image. Such gestures may, however, obstruct part of the image being displayed while the user is zooming in/out, and gesturing may not be intuitively simple to some users or easy to perform while holding a camera steadily.

SUMMARY OF THE INVENTION

Embodiments of the invention may provide a user-friendly system, including a display screen for displaying an image and an optical zoom and/or a digital zoom that is/are simple and intuitive to use.

Some embodiments of the invention provide a device in which an image analyzer to determine at least one potential area of interest in the image, for example, one or more areas or items that appear in the image, which a user may wish to zoom in, zoom out, capture, and/or store a displayed image. The device may also include a visual indicator that is arranged to highlight at least a boundary of the at least one potential area of interest either automatically and/or when a particular potential area of interest is selected by a user. The device may also include an optical zoom and/or a digital zoom to change the magnification of an area of interest selected from the at least one potential area of interest. The device may be arranged to allow a user to zoom in and/or zoom out a selected area of interest by dragging the boundary of the selected area of interest over at least part of the display screen, such as towards or away from the center of the display screen.

The device may provide an intuitive and user-friendly user interface for controlling an optical zoom and/or a digital zoom using a one-handed, one-touch gesture. Zooming in/out is accomplished without using control buttons and/or on-screen control icons, and the selected area of interest may not be obstructed by the hands of a user gesturing, a stylus, and/or a cursor as the user is zooming in/out.

The expression, "display screen," as used throughout herein, is intended to include any display means for presentation of visual information such as a cathode ray tube, a flat panel display, a light emitting diode (LED) display, an electroluminescent display (ELD), a plasma display panel (PDP), a liquid crystal display (LCD), etc. According to an embodiment of the invention, the display screen may include a touch screen, for example, a display that can detect the presence and/or location of a touch within the display area, whereby the device is arranged to allow a user to select a part of the image displayed on the touch screen by touching and/or tapping the portion of the image displayed thereon. The touch screen may sense that the display is being touched by a user's finger and/or with an instrument, such as a stylus. However, the display screen according to the invention need not necessarily be a touch screen. Items in an image may, for example, be arranged to be selected using an active object, such as a light pen, or indirectly using a mouse and/or a touch pad to move a cursor on the display means.

When using a touch screen associated with an optical zoom function, a command, such as a single tap of the touch screen may—subsequently to zooming in/out—be used to focus a zoom lens on the portion of the image displayed on the touch screen, whereby zooming in/out and focusing may be carried out quickly and with facility.

According to an embodiment of the invention, the image analyzer is arranged to perform at least one or more of the following: human being-, animal-, silhouette-, and/or face-detection, object recognition, visual contrast analysis and/or optical character recognition (OCR) and/or any other conventional image (or data) analysis that may be used to identify, select, and/or extract at least one potential area of interest from an image. The image analyzer can thereby identify, select, and/or extract at least one particular portion of an image, in which a user is likely to be interested. Instead of treating all items in an image equivalently and/or indiscriminately, certain items may thus be prioritized, designated, and/or filtered out of the image and identified and/or selected as a potential area of interest. The device may, for example, be arranged to enable a user to de-select and/or defer such image analysis, to change the size of a selected area of interest, and/or to choose an area of the image that has not been determined to be a potential area of interest. In some embodiments, the device may, for example, be arranged to enable a user to de-select and/or defer such image analysis of at least a portion of the potential area of interest.

According to another embodiment of the invention, the image analyzer may be arranged to receive, store, and/or recall user input as to what constitutes a potential area of interest for that particular user. A user may, for example, wish to view and/or capture only the faces of people from an image of a group of people. Additionally, an image analyzer may be arranged to identify a particular person from their face and designate—based on the user's input—only that person's face as a potential area of interest.

According to a further embodiment of the invention, the aforementioned boundary may be represented by a frame of any regular or irregular shape around the at least one potential area of interest, by default and/or by user selection. Multiple boundaries may be used concurrently, for example, associated with subset areas of the potential area of interest. For example, zoom in/zoom out functions may be used within other areas in which zoom in/zoom out functions are in use.

According to an embodiment of the invention, the aforementioned visual indicator may be arranged to highlight or otherwise identify at least the boundary of a potential area of interest if and/or when a user selects a portion of the image which lies at least partially within the boundary of that potential area of interest. The visual indicator may be configured to highlight the potential area of interest partially and/or in its entirety, using shading and/or color and/or by causing the potential area of interest to be displayed intermittently (e.g., flash), and/or by any graphically distinguishing technique. The device may, for example, be configured to alternately show an entire image and then only show the potential areas of interest of that image, in sequence, periodically, at regular and/or irregular intervals that may be, for example, user selected and/or predetermined by default.

According to a further embodiment of the invention, the device may be arranged to allow a user to select a plurality of different portions of the image (that may or may not overlap) displayed on the display screen simultaneously (e.g., concurrently) and/or consecutively, for example, to select a plurality of the potential areas of interest or to select any other areas of the image displayed on the display screen. A user may, for example, wish to zoom in on a plurality of the faces in an image of a group of people, in which case the user may select one face at a time by pointing to it by finger, for example, and then zooming in/out as desired. Alternatively and/or additionally, the device may be configured to allow the user to store each area of interest that is selected in an image automatically and/or on the reception of a command, such as tapping the display screen a distinct number of times.

According to an embodiment of the invention, the visual indicator may be configured to highlight further potential areas of interest within a highlighted potential area of interest, such as one or more facial features (e.g., eyes) of a person whose face is associated with (e.g., lies within) a designated potential area of interest, when a user selects that face.

According to another embodiment of the invention, the device may include a portable device, such as a mobile telephone, media player, such as an MP3 player, Personal Communications System (PCS) terminal, Personal Data Assistant (PDA), laptop computer, palmtop receiver, camera, such as a video camera, and/or television. Embodiments of the invention may be implemented in other devices, as well.

It should be noted that the components of a device, according to embodiments of the present invention, need not necessarily be located at a single location and/or within a single device, but may be arranged remotely, for example, and be in wired and/or wireless communication with each other.

Embodiments of the present invention also may relate to a method for zooming in and/or zooming out on one or more portions of an image displayed on a display screen. The method may include a number of steps; for example, displaying an image on a display screen, determining at least one potential area of interest in the image automatically or on request, for example, automatically determining areas which a user may be interested in without the user having to provide input as to which area(s) the user is interested, highlighting at least a boundary of the at least one potential area of interest, and zooming in/zooming out the highlighted (e.g., enclosed) portion of the image when a user drags the boundary of a highlighted potential area of interest over at least portion of the display screen.

According to an embodiment of the invention, the step of determining the at least one potential area of interest may include performing at least one or more of the following, in the image shown on the display screen: human being-, animal-, silhouette-, and/or face-detection, object recognition, visual contrast analysis and/or optical character recognition (OCR).

According to another embodiment of the invention, the step of determining the at least one potential area of interest may include receiving user input as to what particularly constitutes the at least one potential area of interest.

According to a further embodiment of the invention, the step of highlighting at least a boundary of the at least one potential area of interest may include displaying a frame around a potential area of interest if and/or when a user selects a portion of the image which lies at least partially within the boundary of that potential area of interest.

According to an embodiment of the invention the visual indicator may be arranged to highlight at least a boundary of a potential area of interest if and/or when a user selects a portion of the image which lies at least partially within the boundary of that potential area of interest.

According to another embodiment of the invention, the display screen may include a touch screen whereby the selection of a portion of the image may be made by touching, tapping, and/or otherwise activating the portion of the image displayed on the touch screen.

According to a further embodiment of the invention the method include the step of selecting a plurality of portions of the image that is displayed on the display screen simultaneously and/or consecutively.

According to an embodiment of the invention, the method may include the step of highlighting further potential areas of interest within a highlighted potential area of interest when a user selects that potential area of interest, to thereby form sets, and at least subsets, of potential areas of interest.

Embodiments of the present invention may further relate to a computer program product including a computer program containing computer program code means arranged to cause a computer or a processor to execute the steps of a method according to any of the embodiments of the invention, stored on a computer-readable storage medium, such as one or more storage devices.

BRIEF DESCRIPTION OF THE DRAWINGS

The present invention will hereinafter be further explained by means of non-limiting examples with reference to the appended schematic figures, in which like reference numbers may refer to like elements.

It should be noted that the drawings have not been drawn to scale and that the dimensions of certain features have been exaggerated for the sake of clarity.

DETAILED DESCRIPTION OF EMBODIMENTS

Figure 1:
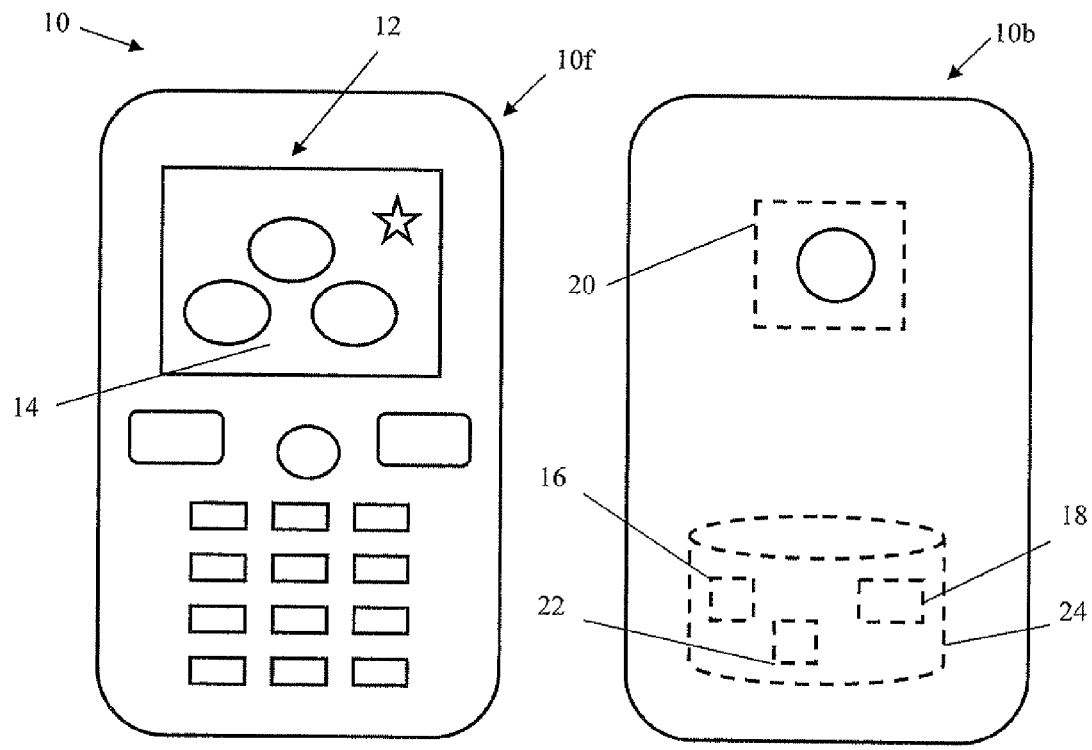
FIG. 1 shows an exemplary device according to an embodiment of the invention.

FIG. 1 shows a front 10*f* and a back 10*b* of a device 10 according to an exemplary embodiment of the invention, for example, a mobile telephone including a camera for capturing still and/or video images. Device may be any other communication and/or network apparatus. Device 10 may include a display screen 12, for example, a touch screen, for displaying an image 14 (e.g., an image that is about to be captured (e.g., recorded) or an image that has already been previously captured (e.g., stored)). Device 10 may also include an image analyzer 16 to, among other things, determine at least one potential area of interest in image 14, for example, by scanning and analyzing (displayed) image 14 for potential areas of interest using any image analysis method.

Device 10 may also comprise a visual indicator 18 that is arranged to highlight at least a boundary of the at least one potential area of interest, an optical zoom 20, and a digital zoom 22, to, for example, change the magnification of at least a portion of image 14. Image analyzer 16, visual indicator 18, optical zoom 20, and/or digital zoom 22 may include hardware and/or software components, whereby any number of the software components may be stored in a, built-in and/or removable, memory 24 of device 10, such as on a universal serial bus (USB) stick (and/or flash drive) that may removably connect to device 10. Alternatively, any number of the software components may be downloaded and/or accessed from another device, a network, etc.

Figure 2:
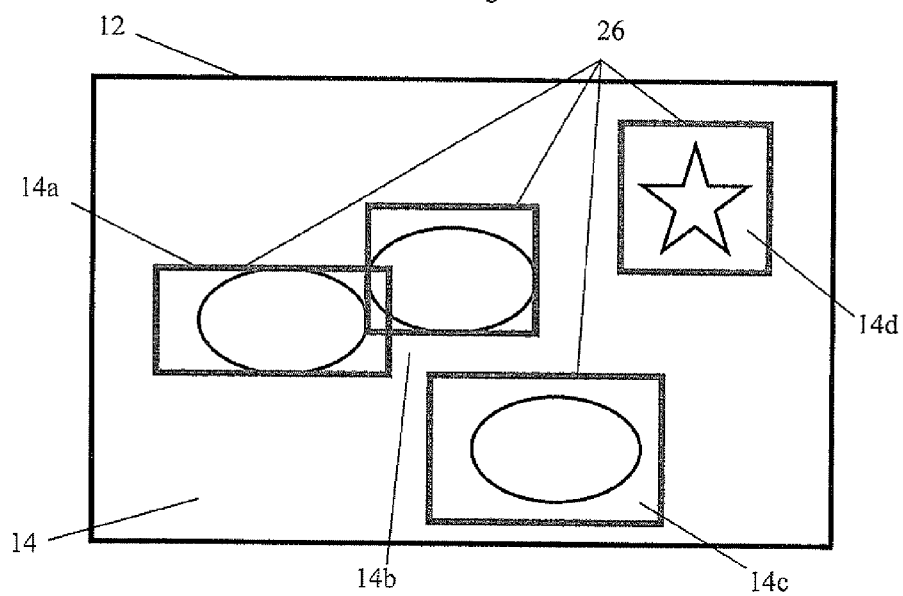
FIGS. 2-4 show an display screen displaying various exemplary images.
Figure 3:
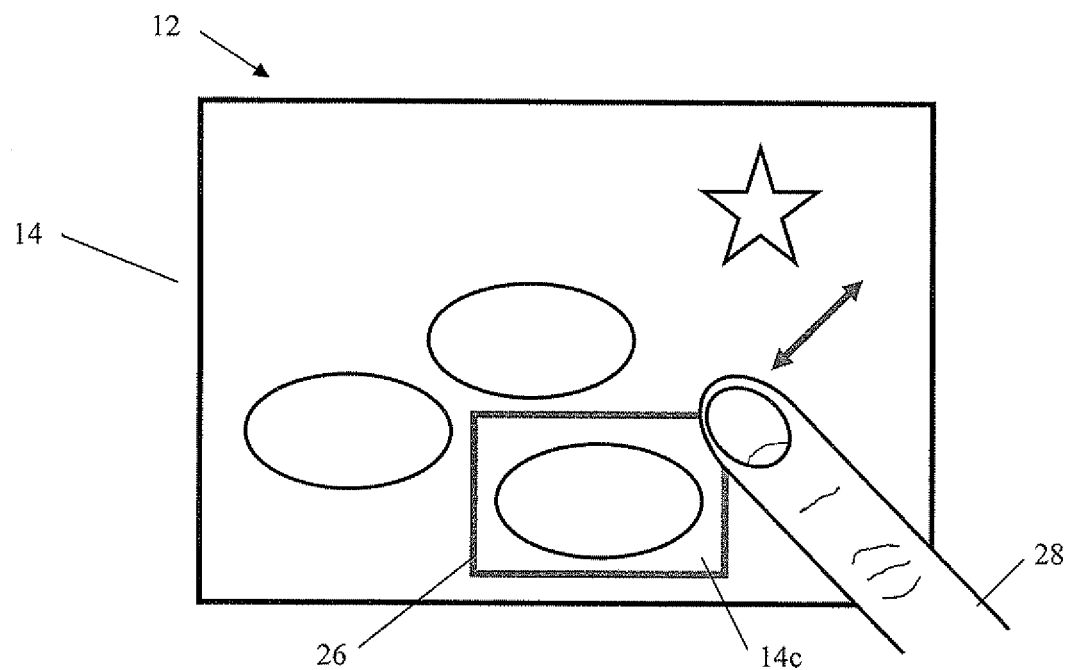

Device 10 may be configured to highlight any number of areas of interest 14a, 14b, 14c, and 14d and present (highlighted) areas of interest 14a, 14b, 14c, and 14d to a user, for example, by presenting (frames) boundary 26 around one or more of respective areas of interest, for example, as shown in FIG. 2. Alternatively and/or subsequently, device 10 may be arranged to highlight an area of interest 14c, for example, cause (a particular) frame 26 to appear around an area of interest, only if and/or when a user selects an item (at least partially) within the boundary of (the particular) area of interest 14c, for example, by pointing to that item using a finger 28, a stylus, a cursor, or other instrument, for example, whereby the boundary of (the selected) area of interest 14c is indicated by frame 26, for example, in the embodiment illustrated in FIG. 3.

Graphic properties of boundary 26 may vary from one boundary to another. For example, lines used to demarcate boundary 26 may be of varying thicknesses. The various properties may correspond to various qualities themselves, for example, a specified degree of potential interest (e.g., the more interest, the darker the line used for delimiting the boundary).

Figure 4:
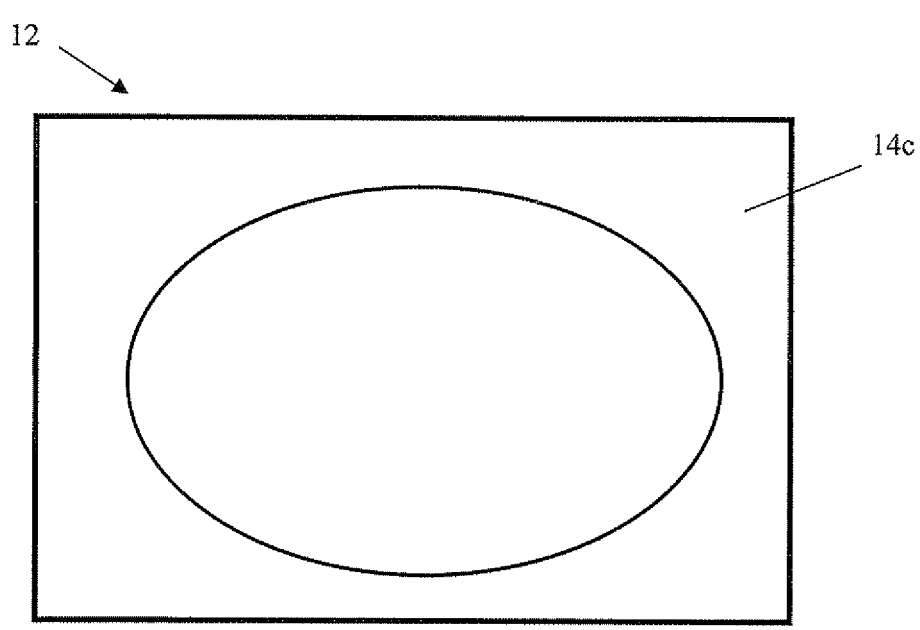

Device 10 may be configured to permit a user to zoom in and/or zoom out (the selected) area of interest 14c by dragging (or otherwise displacing) boundary 26 of (the selected) area of interest 14c over at least a portion of display screen 12, for example, until (the selected) area of interest 14c at least substantially fills display screen 12, as shown in FIG. 4 (e.g., to the exclusion of other previously displayed images not enclosed within boundary 26). Alternatively and/or additionally, device 10 may be configured to automatically magnify a selected area of interest to at least substantially fill display screen 12 on selection of that area of interest and/or on reception of a command to do so. Such a command could, for example, be deemed to have been received when (user's) finger 28 is dragged over display screen 12 to a point of contact with an edge of display screen 12. Alternatively and/or additionally, device 10 may be configured to automatically magnify a selected area of interest to at least substantially fill display screen 12 after a predetermined amount of time has lapsed, for example, in which no activity is detected (e.g., user input received) with respect to an area of magnification and/or (the selected) area of interest 14c. Also, after a time interval has lapsed, for example, in which no activity is detected (e.g., user input received) with respect to (the selected) area of interest 14c, device 10 may be configured to "de-select" (the selected) area of interest 14c as an area of interest.

Where device 10 include optical zoom 20, the associated camera optics of device 10 may be focused so as to capture (the selected) area of interest 14c and subsequently capture (that selected) area of interest 14c as an image, which may, for example, be stored in memory 24 of device 10 and/or transmitted by device 10 to be stored and/or processed elsewhere. Alternatively and/or additionally, where device 10 includes digital zoom 22, a captured image may be viewed and/or stored at the desired magnification. A user may then select another area of interest 14a, 14b, or 14d for viewing, capturing, storing, manipulating, and/or otherwise processing additional images that are selected in a like and/or different manner.

Image analyzer 16 may be arranged to perform at least one or more of the following: human being-, animal-, silhouette-, and/or face-detection, object recognition, visual contrast analysis and/or optical character recognition (OCR), in order to be able to determine parts of image 14 that may be of interest to (e.g., selected by) a user. Alternatively and/or additionally, image analyzer 16 may be arranged to receive user input and/or characterization at to what constitutes a potential area of interest. A user may, for example, indicate that an interest limited to the faces of persons appearing in (a particular) image 14 or set of selected images. In such a case, image analyzer 16 may ignore other rendered objects, such as the object highlighted in area 14d of FIG. 2 (as an object of non-interest), as potential areas of interest.

Figure 5:
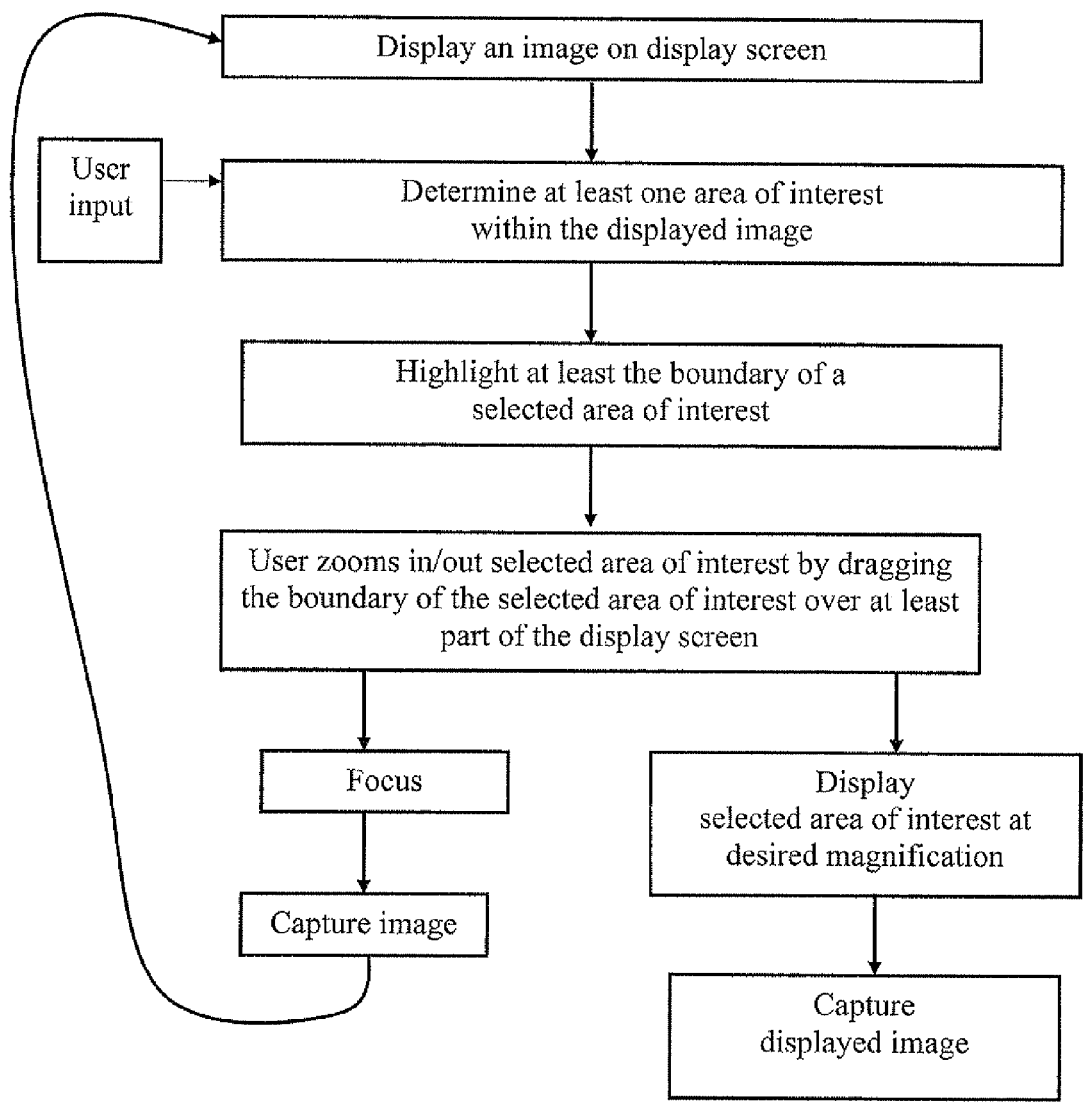
FIG. 5 is a flow chart showing exemplary steps of a method according to an embodiment of the invention.

FIG. 5 is a flow chart showing exemplary steps of a method for zooming in and/or zooming out of a portion of an image displayed on a display screen, according to an embodiment of the invention. The method may include the technique of displaying an image on a display screen, for example, a captured image or an image that the user is viewing and perhaps contemplating capturing (e.g., as viewed in a viewfinder). At least one potential area of interest in the image may then be determined automatically, for example, by performing at least one or more of the following in the image shown on the display screen: human being-, animal-, silhouette-, and/or face-detection, object recognition, visual contrast analysis and/or optical character recognition (OCR), and/or using user input as to what, specifically, constitutes an area of interest. At least a boundary of the at least one potential area of interest may then be highlighted or otherwise marked. A user may then zoom in or zoom out the highlighted portion of the image by selecting an item of the image within the highlighted portion of the image and then, for example, dragging the boundary thereof over at least a portion of the display screen, for example, towards or away from the center or other designated area of the display screen.

Once a user has a desired image on the display screen, a camera's optics may be focused so as to capture that image, whereupon the captured image may be stored and/or the steps of the method may be repeated in order to zoom in/zoom out a portion of the captured image to view the specified portion of the captured image and/or to store the specified portion of the captured image.

The present invention may also include a computer program product (e.g., storage device) that may store a computer program containing computer program code means (e.g., a set of instructions) arranged to cause a computer or a processor to execute the steps of a method according to any of the embodiments of the invention.

Further modifications of the invention within the scope of the claims would be apparent to a skilled person. For example, it should be noted that zooming in/out at least a portion of a displayed image may be arranged to affect something other than only the magnification of the image (e.g.

focusing). The device, method, and/or computer program product of the present invention may for example be used to increase and/or decrease the volume of sound emitted by a device, such as music from a loudspeaker, whereby the volume of the sound is represented graphically as an image on a display screen, such as by a volume scale. As an example, the temperature of a domestic appliance, such as central heating, a fridge and/or an oven could be increased and/or decreased when the image of that household appliance on a graphical user interface is magnified by a user in order to view a temperature gauge whose set temperature may be adjusted by zooming in on the temperature gauge.

What is claimed is:

1. A device comprising:
   a display screen to render an image to a user;
   an image analyzer to determine at least one potential area of interest in the image;
   a visual indicator to:
   highlight a boundary of the at least one potential area of interest, and
   highlight at least one other potential area of interest within a highlighted potential area of interest when the user selects the highlighted potential area of interest; and
   a zoom arrangement to change magnification of an area of interest selected from the at least one potential area of interest,
   where the device is configured to permit the user to zoom in and zoom out of the selected area of interest by dragging the boundary of the at least one potential area of interest over at least a portion of the display screen.

2. The device of claim 1, where the image analyzer is to perform at least one of human being recognition, animal recognition, silhouette recognition, face-detection, object recognition, visual contrast analysis, or optical character recognition.

3. The device of claim 1, where the image analyzer is arranged to receive user input defining the at least one potential area of interest.

4. The device of claim 1, where the boundary is represented by a frame encompassing the at least one potential area of interest.

5. The device of claim 1, where the visual indicator is to highlight at least the boundary of the at least one potential area of interest based on a user selection of a part of the image which lies within the boundary of the at least one potential area of interest.

6. The device of claim 1, where the display screen is a touch screen, and the device is configured to permit the user to select a particular portion of the displayed image by at least one of touching or tapping the particular portion of the displayed image.

7. The device of claim 1, where the device is configured to permit the user to select a plurality of particular portions of the displayed image simultaneously or consecutively.

8. The device of claim 1, where the device is at least one of a mobile telephone, a media player, a personal communication system (PCS) terminal, a personal data assistant (PDA), a laptop computer, a palmtop receiver, a camera, or a television.

9. A method for zooming in and/or zooming out of a portion of an image rendered on a display screen, where the method comprises:
   displaying the image on the display screen to a user;
   determining at least one potential area of interest in the image;
   highlighting a boundary of the at least one potential area of interest;
   highlighting at least one other potential area of interest within a highlighted potential area of interest when the user selects the highlighted potential area of interest; and
   performing zooming on the highlighted part of the image when the user moves the boundary over at least a portion of the display screen.

10. The method of claim 9, where the determining the at least one potential area of interest comprises performing, in the image shown on said display screen, at least of human being-detection, animal-detection, profile-detection, face-detection, object recognition, visual contrast analysis, or optical character recognition (OCR).

11. The method of claim 9, where the determining the at least one potential area of interest comprises receiving user input defining the at least one potential area of interest.

12. The method of claim 9, where the highlighting the boundary comprises displaying a frame around the at least one potential area of interest based on a selection, of a portion of the image which lies within the boundary of the at least one potential area of interest, received from the user.

13. The method of claim 9, where the visual indicator is configured to highlight the boundary, based on a selection, of the image which lies within the boundary of the at least one potential area of interest, received from the user.

14. The method of claim 9, where the display screen is a touch screen, and the method further comprising:
   detecting at least one of touching or tapping of the displayed image on the touch screen associated with a selection made by the user.

15. The method of claim 9, further comprising:
   selecting a plurality of portions of the displayed image simultaneously or serially.

16. A computer program product comprising:
   a computer-readable storage device storing one or more sets of instructions to cause a processor of a computer to:
   display an image on a display screen to a user;
   determine at least one potential area of interest in the image;
   highlight a boundary of the at least one potential area of interest;
   highlight at least one other potential area of interest within a highlighted potential area of interest when the user selects the highlighted potential area of interest; and
   perform zooming on the highlighted part of the image when the user moves the boundary over at least a portion of the display screen.

* * * * *